(12) United States Patent
Edwards et al.

(10) Patent No.: US 9,382,128 B2
(45) Date of Patent: Jul. 5, 2016

(54) STABLE NANO TITANIA SOLS AND A PROCESS FOR THEIR PRODUCTION

(75) Inventors: John Edwards, County Durham (GB); Karl Lowry, County Durham (GB)

(73) Assignee: HUNTSMAN P&A UK LIMITED, Wynyard Park (GB)

( * ) Notice: Subject to any disclaimer, the term of this patent is extended or adjusted under 35 U.S.C. 154(b) by 1141 days.

(21) Appl. No.: 13/394,461

(22) PCT Filed: Sep. 10, 2010

(86) PCT No.: PCT/GB2010/051515
§ 371 (c)(1),
(2), (4) Date: Mar. 6, 2012

(87) PCT Pub. No.: WO2011/033286
PCT Pub. Date: Mar. 24, 2011

(65) Prior Publication Data
US 2012/0165186 A1    Jun. 28, 2012

(30) Foreign Application Priority Data
Sep. 17, 2009   (GB) .................................. 0916329.6

(51) Int. Cl.
| | | |
|---|---|---|
| B01J 13/00 | (2006.01) | |
| C01G 23/047 | (2006.01) | |
| B82Y 30/00 | (2011.01) | |
| C01G 23/053 | (2006.01) | |
| C09C 1/36 | (2006.01) | |
| C09D 1/00 | (2006.01) | |

(52) U.S. Cl.
CPC .............. *C01G 23/047* (2013.01); *B82Y 30/00* (2013.01); *C01G 23/053* (2013.01); *C01G 23/0532* (2013.01); *C09C 1/3661* (2013.01); *C09C 1/3669* (2013.01); *C09C 1/3692* (2013.01); *C09D 1/00* (2013.01); *C01P 2004/64* (2013.01); *C01P 2006/22* (2013.01)

(58) Field of Classification Search
CPC ............... C01G 23/047; C01G 23/053; C01G 23/0532; C09C 1/3669; C09C 1/3661; C09C 1/3692; C09D 1/00; C01P 2004/64; C01P 2006/22; B82Y 30/00; B01J 13/0034

USPC ....................................................... 516/88, 93
See application file for complete search history.

(56) References Cited

U.S. PATENT DOCUMENTS

| | | | |
|---|---|---|---|
| 2,448,683 A | 9/1948 | Peterson | |
| 2,819,177 A | 1/1958 | Conn et al. | |
| 4,952,317 A | 8/1990 | Culkin | |
| 5,389,361 A | 2/1995 | Osterried et al. | |
| 5,622,628 A | 4/1997 | Trendell et al. | |
| 5,840,111 A | 11/1998 | Wiederhoft et al. | |
| 6,420,437 B1 | 7/2002 | Mori et al. | |
| 8,158,688 B2 * | 4/2012 | Tadakuma ............. | B82Y 30/00 516/98 |
| 2006/0110319 A1 | 5/2006 | Seok et al. | |
| 2007/0196567 A1 * | 8/2007 | Kojima et al. ................. | 427/162 |
| 2008/0299056 A1 | 12/2008 | Frerichs et al. | |
| 2009/0061230 A1 | 3/2009 | Berkei et al. | |
| 2009/0062111 A1 | 3/2009 | Fu et al. | |
| 2009/0136757 A1 * | 5/2009 | Wursche ............... | B01D 61/142 428/402 |
| 2010/0187174 A1 | 7/2010 | Wursche et al. | |
| 2010/0251931 A1 * | 10/2010 | McIntyre ................... | 106/31.13 |
| 2013/0305960 A1 * | 11/2013 | Edwards ............... | C01G 23/047 106/287.19 |

FOREIGN PATENT DOCUMENTS

| | | |
|---|---|---|
| CN | 101433786 A | 5/2009 |
| EP | 0 518 175 | 12/1992 |
| EP | 1 052 225 | 11/2000 |
| EP | 1 544 256 | 6/2005 |
| WO | 2009/030880 | 3/2009 |

* cited by examiner

*Primary Examiner* — Daniel S Metzmaier
(74) *Attorney, Agent, or Firm* — Monique M. Raub

(57) ABSTRACT

The present invention provides a process for producing a concentrated aqueous nano titania sol in the mild pH range (4.0 to 10.0) comprising contacting an acidic nano titania sol with a dispersant and with an alkalizing agent, and subjecting the nano titania sol to membrane filtration until the nano titania sol contains more than 300 g $TiO_2$ nanoparticles/$dm^3$. The nano titania sol may further be subjected to a coating treatment within any of the steps of the above described process. The concentrated aqueous nano titania sol of this disclosure is suitable for use in a variety of applications, including providing UV protection and photochemically degrading or inactivating contaminants.

14 Claims, No Drawings

STABLE NANO TITANIA SOLS AND A PROCESS FOR THEIR PRODUCTION

CROSS-REFERENCE TO RELATED APPLICATIONS

This application is the National Phase of International Application PCT/GB2010/051515 filed Sep. 10, 2010 which designated the U.S. and which claims priority to Great Britain App. Serial No. 0916329.6 filed Sep. 17, 2009. The noted applications are incorporated herein by reference.

STATEMENT REGARDING FEDERALLY SPONSORED RESEARCH AND DEVELOPMENT

Not applicable.

FIELD OF THE INVENTION

This disclosure, in general, relates to stable concentrated nano titania sols and to the processes for their production and use. For example, this disclosure relates to stable concentrated nano titania sols in the mild pH range (4.0-10.0) and to the processes for their production and use.

BACKGROUND

Titania or titanium dioxide ($TiO_2$) is generally present in the market place in either of two predominant polymorphs, anatase or rutile, and has an average particle size of 150 nm to 250 nm. Because of its high refractive index, negligible color and inertness, it is useful as an opacifier in paints, paper, plastics, ceramic, inks, etc. Titanium dioxide having a smaller average particle size, for example in the 1 nm to 150 nm average particle size range is referred to as nano titania. Nano titania finds uses in cosmetics, personal care products, plastics, surface coatings, self-cleaning surfaces and photovoltaic applications due to its: i) translucency combined with photoprotective properties; ii) photocatalytic properties; and iii) conductive properties combined with high surface area.

Issues surrounding nano titanium dioxide products supplied in powder form include: i) the difficulties encountered in dispersing the products to the required size; and ii) dust/handling concerns due to the fineness of the nano titania powder. A nano titanium dioxide product supplied in the form of a stable, concentrated sol would address both of these critical issues.

Stable aqueous nano titanium dioxide sols have been reported throughout the literature. However, their production has been limited to either very low (<pH 2) or very high (>pH 10) pH regions or to low concentrations (<300 gpl).

In U.S. Pat. No. 2,448,683, a process is described in which hydrous titanium dioxide is first neutralized then peptized with HCl to form a colloidal titanium dioxide sol. The colloidal titanium dioxide sol is then neutralized, dried and calcined at a temperature ranging from about 500°-600° C. before the calcined product is re-dispersed.

In U.S. Pat. Publ. No. 2006/0110319, rutile nano-sized titanium dioxide sols are prepared via the hydrolysis of titanium tetraisopropoxide in an aqueous solution containing hydrogen peroxide and subsequently hydrothermally treated at a temperature of 50°-120° C.

U.S. Pat. Publ. No. 2009/0062111 describes a process for forming a nano-sized titanium dioxide sol including the precipitation of hydrous titanium dioxide from a titanium iospropoxide solution and peptization of the hydrous titanium hydroxide with an α-hydroxy carboxylic acid at a temperature of 70°-150° C. for an extended period of time.

U.S. Pat. Publ. No. 2009/0061230 also describes a process for forming a stable nano-sized titanium dioxide sol through the reaction of a halide-containing titanium compound with water in the presence of a polyol.

In U.S. Pat. No. 5,840,111, a nano-sized titanium dioxide sol is prepared by the addition of a solution of sulphuric acid and titanyl sulphate to an alkaline reacting medium to form titanium dioxide nanoparticles, flocculating the nanoparticles through the addition of a monobasic acid and then isolating the flocculate by filtration.

As such, alternative means for producing highly stable nano-sized titanium dioxide sols are still highly desirable, and in particular, means for producing highly stable concentrated nano-sized titanium dioxide sols.

SUMMARY

The present disclosure provides a process for producing a concentrated aqueous nano titania sol comprising:
  (a) contacting an acidic nano titania sol with a dispersant comprising at least one of a water soluble carboxylic acid, a water soluble salt of a carboxylic acid, a water soluble polycarboxylic acid, a phosphate or a silicate and with an alkalizing agent wherein the pH of the nano titania sol after contacting is in a range of between about 4.0 and about 10.0; and
  (b) subjecting the pH adjusted nano titania sol to membrane filtration, preferably crossflow filtration or crossflow filtration with vibration, and continuing membrane filtration until the nano titania sol contains more than 300 g $TiO_2$ nanoparticles/$dm^3$.

The present disclosure also provides a process for producing a concentrated aqueous nano titania sol comprising:
  (a) providing an acidic nano titania sol;
  (b) contacting the acidic nano titania sol with a dispersant comprising at least one of a water soluble carboxylic acid, a water soluble salt of a carboxylic acid, a water soluble polycarboxylic acid, a phosphate or a silicate and with an alkalizing agent wherein the pH of the nano titania sol after contacting is in a range of between about 4.0 and about 10.0; and
  (c) subjecting the pH adjusted nano titania sol to membrane filtration, preferably crossflow filtration or crossflow filtration with vibration, and continuing membrane filtration until the nano titania sol contains more than 300 g $TiO_2$ nanoparticles/$dm^3$.

In another embodiment, the pH adjusted nano titania sol may be contacted with a washing agent during step (b) or step (c) of the processes described above, respectively, preferably before concentration of the nano titania sol has begun, to remove soluble salts from the nano titania sol.

According to another embodiment, the nano titania sol may be subjected to a coating treatment before, during or after any of the steps of the above process.

The concentrated aqueous nano titania sol of this disclosure is suitable for use in a variety of applications, including providing UV protection and photochemically degrading or inactivating contaminants.

DESCRIPTION OF THE PREFERRED EMBODIMENT(S)

In this specification and in the claims which follow, reference will be made to a number of terms which shall be understood to have the following meanings.

The term "nano titania sol" refers to a colloidal suspension of $TiO_2$ nanoparticles having a particle size of less than 150 mu, preferably less than 100 nm. The $TiO_2$ nanoparticles may be anatase, rutile or amorphous or a mixture thereof.

The terms "crossflow filtration" and "crossflow filtration with vibration" refer to filtration processes in which a suspension of solid particles in a fluid medium is caused to flow tangentially across the surface of a membrane while being subjected to a pressure which tends to cause the fluid medium of the suspension to flow through the membrane which is permeable to the fluid medium but not the solid particles. The flow of the suspension across the surface of the membrane minimizes any excessive build-up of solids on the surface of the membrane. Mechanical vibration of the surface of the membrane may be used to reduce the plugging or fouling of the membrane. Such a process is described, for example, in U.S. Pat. No. 4,952,317, the contents of which are expressly incorporated herein by reference.

The present disclosure provides a process for producing a concentrated aqueous nano titania sol. In one embodiment of this disclosure, the concentrated aqueous nano titania sol is produced by a process comprising the steps:

(a) contacting an acidic nano titania sol with a dispersant comprising at least one of a water soluble carboxylic acid, a water soluble salt of a carboxylic acid, a water soluble polycarboxylic acid, a phosphate or a silicate, and with an alkalizing agent wherein the pH of the nano titania sol after contacting is in a range of between about 4.0 and about 10.0; and (b) subjecting the pH adjusted nano titania sol to membrane filtration, preferably crossflow filtration or crossflow filtration with vibration, and continuing membrane filtration until the nano titania sol contains more than 300 g $TiO_2$ nanoparticles/$dm^3$.

In another embodiments of this disclosure, the concentrated aqueous nano titania sol is produced by a process comprising the steps:

(a) providing an acidic nano titania sol;

(b) contacting the acidic nano titania sol with a dispersant comprising at least one of a water soluble carboxylic acid, a water soluble salt of a carboxylic acid, a water soluble polycarboxylic acid, a phosphate or a silicate and with an alkalizing agent wherein the pH of the nano titania sol after contacting is in a range of between about 4.0 and about 10.0; and (c) subjecting the pH adjusted nano titania sol to membrane filtration, preferably crossflow filtration or crossflow filtration with vibration, and continuing membrane filtration until the nano titania sol contains more than 300 g $TiO_2$ nanoparticles/$dm^3$.

Substantially all of the steps of the process of the present invention may be performed at temperatures below 100° C. thus making their implementation into a commercial setting simple and economical. The concentrated aqueous nano titania sol produced by the inventive process demonstrates exceptional stability over a wide pH range, especially at a mild pH range of 4.0 to 10.0 (e.g., 6.0 to 8.0), making the sol environmentally safe and easy to use. Moreover, the concentrated aqueous nano titania sol does not exhibit agglomeration and therefore does not require a milling step to exhibit excellent translucency. Furthermore, even though the nano titania sol is concentrated, it still possesses low viscosity making it particularly suitable for shipment and direct use.

According to an embodiment, an acidic nano titania sol is provided. The acidic nano titania sol may be provided from any means so long as it contains an acidic colloidal suspension of $TiO_2$ nanoparticles. The $TiO_2$ nanoparticles colloidally suspended may be produced from anatase, rutile or amorphous $TiO_2$ which has been prepared by any suitable process. Typical processes may involve hydrolysis of an appropriate titanium compound, such as, titanium tetrachloride, titanyl sulphate or an organic or inorganic titanate, or oxidation of an oxidizable titanium compound, for example, in the vapour state.

In one embodiment, the acidic nano titania sol is produced from $TiO_2$ prepared by a precipitation step in a sulphate process. After precipitation, the obtained titania hydrate is filtered, washed free of impurities, and contacted with an aqueous base to form a suspension having a pH of about neutral. Sulphate ions are then removed from the neutralized suspension by filtration and washing. In one aspect, the filter cake obtained after filtration is washed until the $SO_4^{2-}$ content of the wash filtrate is less than 0.1 g/l (which may be determined by barium chloride solution titration). The washed filter cake is then slurried in water to produce a substantially sulphate-ion-free aqueous suspension of titania hydrate which is then peptized with a strong monoprotic acid pH adjustment to a pH of about 2.0 or below, preferably a pH of about 1.5 to provide the acidic nano titania sol.

The acidic nano titania sol is then contacted with a dispersant and with an alkalizing agent. The acidic nano titania sol may be contacted with the dispersant and alkalizing agent in any order or in combination.

According to one embodiment, the acidic nano titania sol is first contacted with the dispersant. The dispersant comprises at least one of a water soluble carboxylic acid, a water soluble salt of a carboxylic acid, a water soluble polycarboxylic acid, a phosphate or a silicate. In one embodiment, the water soluble carboxylic acid is an α-hydroxy carboxylic acid. The α-hydroxy carboxylic acid may comprise one, two or three carboxylic acid groups, and includes without limitation, lactic acid, glycolic acid, malic acid, tartaric acid, mandelic acid and citric acid. In another embodiment, the water soluble carboxylic acid is a β-hydroxy carboxylic acid. In still another embodiment, the water soluble polycarboxylic acid is a dicarboxylic acid or a tricarboxylic acid. In other embodiments, the dispersant comprises one or more salts of the foregoing acids. In still other embodiments, the dispersant comprises combinations of the foregoing acids and salts, and phosphates and silicates.

The acidic nano titania sol and dispersant may be contacted by any suitable means, such as conventional mixing in a vessel, for a period of time of at least about 0.1 hours, preferably at least about 0.25 hours and more preferably at least about 0.5 hours. In another embodiment, the acidic nano titania sol and dispersant may be contacted for a period of time of less than about 24 hours, preferably less than about 12 hours, and more preferably less than about 3 hours. In still another embodiment, the acidic nano titania sol and dispersant may be contacted for a period of time of between at least about 0.5 hours to less than about 3 hours.

The acidic nano titania sol is also contacted with an alkalizing agent. In one embodiment, the acidic nano titania sol is contacted with the alkalizing agent after contacting with the dispersant. Examples of alkalizing agents include alkanolamines, preferably water soluble alkanolamine such as isopropanolamine, and choline hydroxide. The period of time which the acidic nano titania sol is contacted with the alkalizing agent is a period of time sufficient to adjust the pH of the acidic nano titania sol to a pH in the range of between about 4.0 and about 10.0.

The pH adjusted nano titania sol is then subjected to the effects of membrane filtration, preferably crossflow filtration or crossflow filtration with vibration, to obtain a concentrated nano titania sol containing at least 300 g $TiO_2$ nanoparticles/$dm^3$. In other embodiments, the nanotitania sol is subjected to the effects of membrane filtration to obtain a concentrated nano titania sol containing at least 500 g $TiO_2$ nanoparticles/$dm^3$, preferably at least 550 g $TiO_2$ nanoparticles/$dm^3$, and more preferably at least 600 g $TiO_2$ nanoparticles/$dm^3$, and even more preferably at least 700 g $TiO_2$ nanoparticles/$dm^3$. Preferably, the concentrated nano titania sol has a viscosity of about 0.001 Pa s to about 0.2 Pa s at 20° C. The solids content of the pH adjusted nano titania sol which is the feedstock for membrane filtration will generally be less than about 350 g $TiO_2$ nanoparticles/$dm^3$. Thus, in one embodiment, the solids content of the pH adjusted nano titania sol feed stock ranges between at least about 100 g $TiO_2$ nanoparticles/$dm^3$ to less than about 350 g $TiO_2$ nanoparticles/$dm^3$.

Optionally, the pH adjusted nano titania sol may be contacted with a washing agent, for example water, preferably demineralized water, any time during the membrane filtration step to remove a portion of or substantially all soluble salts from the nano titania sol. In one embodiment, the pH adjusted nano titania sol is contacted with the washing agent prior to concentrating the nano titania sol. In another embodiment, the pH adjusted nano titania sol is contacted with the washing agent after concentrating the nano titania sol. The reduction of water soluble salts from the nano titania sol assists in producing a concentrated nano titania sol having a desirably low conductivity. In one aspect, the nano titania sol is contacted with the washing agent for a period of time sufficient to reduce the nano titania sol's conductivity to less than 10 mS/cm, preferably less than 5 mS/cm, and more preferably less then 2 mS/cm.

In still another aspect, the nano titania sol may optionally be subjected to a coating treatment by contacting the nano titania sol with a coating agent. The coating treatment may be performed before, during or after any of the steps of the above described process. In one embodiment, the coating treatment is performed after contacting the acidic nano titania sol with the dispersant and with the alkalizing agent in. In another embodiment, the coating treatment is performed during the membrane filtration step or step (c) of the process, preferably after the pH adjusted nano titania sol has been contacted with the washing agent to remove soluble salts from the nano titania sol but prior to concentration. The coating agent suitable for use includes an alkaline or acidic coating agent, for example, those commonly used to coat an inorganic oxide or hydrous oxide onto the surface of the $TiO_2$ nanoparticles. Typical inorganic oxides and hydrous oxides include one or more oxides and/or hydrous oxides of silicon, aluminum, titanium, zirconium, magnesium, zinc, cerium, phosphorus, or tin. The amount of coating coated onto the surface of the $TiO_2$ nanoparticles may range from about 0.1 wt % to 50 wt. % of the inorganic oxide and/or hydrous oxide relative to the weight of the $TiO_2$ nanoparticles. Examples of alkaline coating agents include sodium silicate, potassium silicate, sodium aluminate or mixtures thereof. Examples of acidic coating agents include aluminum chloride, aluminum sulphate or a mixture thereof.

A cation exchange resin may also be employed during the coating treatment to ensure that the ionic strength of the nano titania sol remains low during treatment and colloidal stability is maintained. In this embodiment, the nano titania sol is contacted with an alkaline coating agent, preferably sodium silicate, and the cation exchange resin in a batch tank. The addition rates of the sodium silicate and cation exchange resin are controlled such that the pH of the sol in the batch tank remains in a range of between about 4.0 and about 10.0. In another embodiment, the sol and alkaline coating agent are passed through a column or support containing the cation exchange resin at a rate such that the pH of the effluent remains in a range of between about 4.0 and about 10.0. Any cation exchange resin is suitable for use, including those generally known, such as strong acid cation exchange resins containing sulphonic acid groups, weak acid cation exchange resins containing carboxylic acid groups or a mixture thereof. In certain embodiments, if removal of the cation exchange resin is desired, then techniques known in the art may be used to facilitate such removal.

An anion exchange resin may also be employed during the coating treatment. In this embodiment, the nano titania sol is contacted with an acidic coating agent and the anion exchange resin in a batch tank. The addition rates of the acidic coating agent and anion exchange resin are controlled such that the pH of the sol in the batch tank remains in a range of between about 4.0 and about 10.0. In another embodiment, the sol and acidic coating agent are passed through a column or support containing the anion exchange resin at a rate such that the pH of the effluent remains in a range of between about 4.0 and about 10.0. Any anion exchange resin is suitable for use, including those generally known, such as strong base anion exchange resins containing hydroxide or quaternary ammonium groups, weak base anion exchange resins containing primary or secondary amino groups or a mixture thereof.

The concentrated aqueous nano titania sol produced exhibits exceptional stability and transparency. Current known processes involve drying a nano titania sol (which leads to some inter-particle cementation) and a subsequent milling step. The process of the present invention avoids both drying and milling yet provides well dispersed sols. Thus, nano-dispersions may be achieved in formulated systems containing the concentrated nano titania sols produced by the inventive process. Moreover, the present invention provides a sol in improved physical form (i.e. a colloidal suspension v. a low density cohesive powder) which greatly aids in subsequent handling and processing of the nano titania sol.

The concentrated aqueous nano titania sols produced according to the invention are suitable for use as a coating or in an article. For example, the concentrated aqueous nano titania sol may be used in: personal care products and cosmetic formulations, such as sunscreens, moisturizers, color foundations, lipstick, lip balm, foot care products and ointments; coatings and masonry formulations, such as in automotive coatings, wood coatings, building coatings, roofing granules, roofing shingles, building siding, flooring, swimming pool surfaces, and cement or concrete; as a catalyst or photocatalyst or as a support in catalyst products; photovoltaic cells; plastic parts, films, and resin systems including agricultural films, food packaging films, molded automotive plastic parts, and engineering polymer resins; rubber based products including silicone rubbers; textile fibers used in woven and nonwoven applications including polyamide, polyaramid, and polyimides fiber products and nonwoven sheets products; ceramics; glass products including architectural glass, automotive glass, and industrial glass; flame retardants; and, electronic components.

According to another embodiment, the concentrated aqueous nano titania sol may be used in a method to provide UV protection to a surface of a substrate. The method includes applying the concentrated aqueous coated nano titania sol, in the presence or absence of a binder medium, to a surface of a substrate as a film. The sol may be applied using various application techniques, for example, dipping, spraying, spin-coating, soaking, brushing and doctor blading. Preferably, the concentrated coated nano titania sol is applied to a thickness of about 0.001 mm to about 0.2 mm as measured in the liquid state. The applied film then forms a protective coating on the surface of the substrate. The film may optionally be dried. The substrate may include, but is not limited to, textile fiber, furniture, paper, pavers, tile, concrete, cement, wood, ceramic, polymeric, leather, asphalt, a building exterior, and glass. In another embodiment, the concentrated aqueous nanotitania sol is introduced into a cosmetic and the mixture is applied as above to the surface of skin to provide UV protection.

According to a further embodiment, there is provided a catalytic composition comprising the concentrated aqueous nano titania sol produced by the process of this disclosure. The catalytic composition containing the concentrated nano titania sol may be used to facilitate a wide variety of reactions and may be characterized by the rate of conversion of a chemical reaction when the reactants of the reaction are in contact with the catalytic composition. In one embodiment, the catalytic composition is present on a support. Examples of support materials include glass, ceramic, metal, plastic, cement, concrete, asphalt, textile and paper. The support may be porous or non-porous. Examples of porous supports include a mat of fibers, a zeolite, or a porous film. The term "on a support" refers to when the catalytic composition is on at least a portion of a surface of the support. For porous supports, the term "on a support" further refers to when the catalytic composition is additionally present within the pores of the support.

In one embodiment, the catalytic composition may be mixed with a reactant fluid and irradiated with visible light to provide for a chemical reaction of one or more components of the reactant fluid. The catalytic composition may then be recovered from the fluid and recycled for use in another portion of the reactant fluid. The catalytic composition may be used in place of general metal catalysts such as cobalt, nickel, copper, gold, iridium, lanthanum, nickel, osmium, platinum, palladium, rhodium, ruthenium, silver, strontium, yttrium, zirconium and tin.

In another embodiment, the catalytic composition is present on a support, and the reactant fluid may flow in contact with the support and the composition, and when irradiated with light, provides for a chemical reaction of one or more components of the reactant fluid. In this configuration, the catalytic composition may be exposed to a constant stream of fluid and does not require separation of the catalytic composition from the fluid after the reaction is performed. For example, a catalytic composition may be applied to a support, for example an automobile exhaust system, where the exhaust system has been fitted with a visible or UV light source, such as a fiber optic light source or an LED light source. Irradiation of the catalytic composition during operation of the automobile engine may provide for degradation of organics and other pollutants generated in the engine into environmentally acceptable substances.

In another embodiment, the catalytic composition may be present on a surface that is contacted with various environmental contaminants or pollutants, such as dirt, grease and other organic and inorganic contaminants and pollutants. The catalytic composition, optionally a formulation comprising the catalytic composition, is applied to the surface and the surface is irradiated with UV/visible light while the contaminants or pollutants contact the surface. Upon exposure to UV/visible light, the surface becomes "self-cleaning" and degrades or inactivates the contaminants or pollutants. For example, self-cleaning glass may have a transparent or translucent coating of the catalytic composition applied on one or both sides of the glass. Contaminants that contact the glass may then be degraded when the glass is exposed to UV/visible light. It may be desirable for self-cleaning glass to have a hydrophilic surface, to provide for rinsing of any remaining degradation products from the glass with water.

In another embodiment, the catalytic composition may be present on a surface that is exposed to microbes, such as bacteria and fungi, and/or to viruses. Upon exposure to UV/visible light, such a surface may be a "disinfecting surface" by destroying or inactivating microbes or viruses that are present on the surface. For example, surfaces in residential, commercial or hospital environments may have a coating of the catalytic composition applied on the surface. Microbes and/or viruses that contact the surface may then be destroyed or inactivated when the surface is exposed to UV/visible light. Examples of surfaces that may be made into disinfecting surfaces include countertops, flooring, walls, handles, switches, knobs, keypads, telephones, and surfaces of medical instruments.

The catalytic composition may also be applied to a surface to provide temporary disinfection of the surface. For example, the catalytic composition may be introduced into a cleaning composition. The cleaning composition may be in the form of a liquid, foam or a lotion. Application of the cleaning composition to a surface, followed by exposure of the surface to UV/visible light, may cause the destruction or inactivation of microbes or viruses that are present on the surface. Such cleaning compositions may be formulated for use on skin to provide a disinfecting personal care product.

The catalytic composition containing the concentrated nanotitania sol may also be used for air and/or water purification. For example, the catalytic composition may be mixed with contaminated air or water and irradiated with UV/visible light. Contaminants in the air or water may be degraded into substances that are volatile or that are more easily separated from the air or water. For example, contaminants containing organic substances and halogenated substances may be degraded into carbon dioxide and halide ions, which may then be separated from the air or water. In the case of air purification, the degradation of contaminants such as NO and $NO_2$ either individually or collectively and VOC's may also result in cleaner air and control of odors in the air In another embodiment, the catalytic composition may be used for sensing gases. Because the electrical conductivity of $TiO_2$ nanoparticles varies depending on the chemical composition of their environment, this variable conductivity may provide for the use of the $TiO_2$ nanoparticles to be used in the measurement of the type and/or amount of one or more gases. The electrical resistance of the $TiO_2$ nanoparticles or a material containing the $TiO_2$ nanoparticles may be measured in an environment and compared with the electrical resistance in a control environment. The difference between the measured resistance and the control resistance may be correlated with the amount and/or identity of a gas in the environment. Examples of gases that may be identified and/or measured include hydrogen, carbon monoxide, hydrogen sulfide, and water. Preferably a gas sensor comprising the catalytic composition is used to sense gases at ambient conditions.

In a further embodiment, the catalytic composition may be used for the production of hydrogen and oxygen from water. Water containing the catalytic composition may be decomposed into hydrogen and oxygen by photocatalysis when the water is irradiated with UV/visible light. This decomposition may also be carried out in a photo-electrochemical cell having a photo-anode containing a quaternary oxide. It may be desirable to use a photo-electrochemical cell, as this can provide for separate collection of hydrogen and oxygen from the cell.

In another embodiment, the catalytic composition may be used for the production of electricity from solar radiation, and in particular, in solar cells containing the catalytic composition and dye molecules for sensitizing the $TiO_2$ nanoparticles. For example, an electric current is produced when dye molecules are excited by exposure to light. The excited dye molecules transfer electrons into the conduction band of the nanoparticles which conduct the electrons to a current collector connected to an electrical circuit with a load.

In yet another embodiment, the catalytic composition may be used in composite materials, including polymer composites, fabrics and nonwoven materials. For example, the catalytic composition may be incorporated with fibers into textile fabrics. These fabrics may provide for degradation of contaminants in contact with the fabric when exposed to UV/visible light, resulting in self-cleaning or disinfecting fabrics.

In still another embodiment, the catalytic composition may be used as a bioactive agent. In an aqueous environment, such as within an organism, $TiO_2$ nanoparticles irradiated with UV/visible light may produce hydroxyl ions ($OH^-$), superoxide ions ($O_2^-$), and/or hydrogen peroxide. The $TiO_2$ nanoparticle exposed to UV/visible light while in a cell or in contact with a cell may therefore produce a toxic environment which damages or kills the cell. Thus, the catalytic composition may be used as an anti-cancer agent when delivered to tumor cells. It may be desirable to couple the catalytic composition to a targeting agent that is selectively absorbed by tumor cells. Light may be delivered to the cells containing the catalytic composition laparoscopically, resulting in cell death or a reduction in cell growth or propagation.

The present invention will be further illustrated by a consideration of the following examples, which are intended to be exemplary of the invention. All parts and percentages in the examples are on a weight basis unless otherwise stated.

EXAMPLES

Example 1

Illmenite was digested with concentrated sulphuric acid to obtain a digestion cake. The digestion cake was dissolved in water to form a crude liquor containing iron sulphates, titanium sulphate and some suspended insoluble matter. The iron in ferric form was then reduced chemically and the liquor filtered to remove insoluble matter. The liquor was then concentrated by vacuum treatment and hydrolyzed to precipitate hydrous titania by heating and the addition of nucleating agents. The hydrous titania was separated from impurities by washing and filtration and a titania hydrate suspension was then obtained by mixing the hydrous filter cake with demineralized water. The titania hydrate suspension (pH <2) was then neutralized with ammonia to a pH of 7.05, filtered and washed with water to remove sulphate compounds, with filtrate washings having <100 ppm $SO_4^{2-}$ and then reslurried in water. The pH of the slurry was then taken to a pH 1.50 by the addition of hydrochloric acid and mixed for 30 minutes to produce an acidic nano titania sol at 33% solids. The acidic nano titania sol was then contacted with citric acid (1.0 g citric acid to 10.0 g $TiO_2$) by mixing in a vessel for approximately 20 minutes. The sol was then contacted with monoisopropanolamine by mixing in a vessel for a period of time sufficient to adjust the pH of sol to 8.00. The pH adjusted nano titania sol was then subjected to cross-flow filtration by first contacting the sol with water to remove soluble salts to achieve a conductivity of 4.64 mS/cm and then continuing crossflow filtration until the sol contained 673 g TiO2 nanoparticles per dm³ based on the total weight of the aqueous sol. The resultant sol had a viscosity of 0.035 Pa s (measured at 19.3° C. using a Brookfield viscometer with no. 2 spindle at 100 rpm). The modal particle size was 43 nm, measured using CPS disc centrifuge. The sol had a pH of 8.2.

Example 2

The stable nano titania sol produced in Example 1 was incorporated into a semi-gloss acrylic emulsion at a dry film pigment volume concentration of 18.23%. This coating was then applied to a 125 um Polyester film with a coating wet film thickness of 150 μm. After curing, the resultant coating had an absorbance of 1.546 at a wavelength of 550 nm. A comparative coating incorporating a commercial anatase at the same TiO2 concentration had an absorbance of 2.489 at a wavelength of 550 nm.

Prophetic Example A

An acidic nano titania sol is obtained as in Example 1. The acidic nano titania sol is then contacted with citrate (1.0 g citric acid to 10.0 g $TiO_2$) by mixing in a vessel for approximately 30 minutes. The sol is then contacted with monoisopropanolamine by mixing in a vessel until the pH of the sol is about 8.0. The $TiO_2$ nanoparticles suspended in the pH adjusted sol are then heated to 75° C. and coated with silica (20% by weight $SiO_2$ on $TiO_2$) by the co-addition of sodium silicate and a cation exchange resin such that the pH of the sol remains between about 5.0 and about 10.0. The nano titania sol containing the silica coated $TiO_2$ nanoparticles is then subjected to cross-flow filtration by first contacting the sol with water to remove soluble salts and then continuing cross-flow filtration until the sol until the sol contains more than 30% by weight coated $TiO_2$ nanoparticles based on the total weight of the sol.

Prophetic Example B

A sample of the concentrated aqueous nano titania sol produced in Prophetic Example A is prepared into a sunscreen composition containing the following components:

| Component | % w/w |
| --- | --- |
| Butylene glycol | 3 |
| Ethanol | 12 |
| Perfume | suitable amount |
| Silicic anhydride | 3 |
| Kaolin | 2 |
| Nanotitania sol (diluted with water to provide 12.5 g TiO2/l) | 80 |

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A process for producing a concentrated nanotitania sol comprising:
   (a) providing an acidic nano titania sol;

(b) contacting the acidic nano titania sol with (i) a dispersant comprising at least one of a water soluble carboxylic acid, a water soluble salt of a carboxylic acid, a water soluble polycarboxylic acid, a phosphate or a silicate, and (ii) an alkalizing agent wherein the pH of the nano titania sol after contacting is in a range of between about 4.0 and about 10.0; and (c) subjecting the pH adjusted nano titania sol to membrane filtration and continuing such membrane filtration until the nano titania sol contains more than 300 g $TiO_2$ nanoparticles/$dm^3$, wherein the membrane filtration is crossflow filtration or crossflow filtration with vibration.

2. The process according to claim 1, wherein the nano titania sol contains more than 500 g $TiO_2$ nanoparticles/$dm^3$.

3. The process according to claim 1, wherein the provided acidic nano titania sol is produced from a substantially sulphate-ion-free aqueous suspension of titania hydrate contacted with a strong monoprotic acid.

4. The process according to claim 1, wherein the water soluble carboxylic acid is an α-hydroxy carboxylic acid or a β-hydroxy carboxylic acid, and the water soluble polycarboxylic acid is a dicarboxylic acid or a tricarboxylic acid.

5. The process according to claim 1, wherein the water soluble carboxylic acid is citric acid.

6. The process according to claim 1, wherein the nano titania sol consists essentially of anatase $TiO_2$ nanoparticles having a particle size of less than 150 nm.

7. The process according to claim 6, wherein the $TiO_2$ nanoparticles have a particle size of less than 100 nm.

8. The process according to claim 1, wherein the alkalizing agent is a water soluble alkanolamine or choline hydroxide.

9. The process according to claim 1, wherein the pH adjusted nano titania sol is contacted with a washing agent during step (c) for a period of time sufficient to reduce the nano titania sol's conductivity to less than 10 mS/cm.

10. The process according to claim 1 or claim 9, wherein the nano titania sol is additionally subjected to a coating treatment either before step (c) or during step (c) after the pH adjusted nano titania sol has been contacted with the washing agent to remove soluble salts from the nano titania sol but prior to concentrating the nano titania sol.

11. The process according to claim 10, wherein the coating treatment comprises contacting the nano titania sol with an alkaline coating agent and a cation exchange resin at a rate such that the pH of the nano titania sol remains in a range between about 4.0 and about 10.0 during the coating treatment.

12. The process according to claim 11, wherein the alkaline coating agent comprises sodium silicate, potassium silicate, sodium aluminate or mixtures thereof.

13. The process according to claim 10, wherein the coating treatment comprises contacting the nano titania sol with an acidic coating agent and an anion exchange resin at a rate such that the pH of the nano titania sol remains in a range between about 4.0 and about 10.0 during the coating treatment.

14. The process according to claim 13, wherein the acidic coating agent comprises aluminum chloride, aluminum sulphate or a mixture thereof.

* * * * *